United States Patent
Dhingra et al.

(10) Patent No.: US 12,229,114 B2
(45) Date of Patent: Feb. 18, 2025

(54) DATA ANOMALY DETECTION

(71) Applicants: American Express Travel Related Services Company, Inc., New York, NY (US); American Express (India) Private Limited, Gurgaon (IN)

(72) Inventors: Vinay Dhingra, Gurugram (IN); Agraj Gupta, New Delhi (IN); Ashank Gupta, New Delhi (IN); Vaibhav Gupta, New Delhi (IN); Anam Hyderi, Udaipur (IN); Sandeep Pattanayak, Jodhpur (IN); Purvi Shah, New Brunswick, NJ (US); Shikha, New Delhi (IN)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 40 days.

(21) Appl. No.: 17/953,390

(22) Filed: Sep. 27, 2022

(65) Prior Publication Data

US 2024/0104083 A1 Mar. 28, 2024

(51) Int. Cl.
*G06F 16/00* (2019.01)
*G06F 16/23* (2019.01)

(52) U.S. Cl.
CPC ................ *G06F 16/2365* (2019.01)

(58) Field of Classification Search
None
See application file for complete search history.

(56) References Cited

U.S. PATENT DOCUMENTS

| | | | |
|---|---|---|---|
| 11,409,966 B1 * | 8/2022 | Phand | G06N 3/086 |
| 11,853,853 B1 * | 12/2023 | Beauchesne | G06N 5/01 |
| 12,033,048 B1 * | 7/2024 | Callot | G06F 18/214 |
| 2005/0125434 A1 * | 6/2005 | Fan | G06N 20/00 |
| | | | 707/999.102 |
| 2019/0020670 A1 * | 1/2019 | Brabec | G06N 20/00 |
| 2020/0005193 A1 * | 1/2020 | Nie | G06F 11/0709 |
| 2020/0201701 A1 * | 6/2020 | Wang | H04L 63/1425 |
| 2022/0076109 A1 * | 3/2022 | Srivastava | G06N 3/08 |
| 2022/0197890 A1 * | 6/2022 | Fotak | G06F 17/18 |
| 2022/0200878 A1 * | 6/2022 | Fotak | G06F 18/214 |
| 2022/0351868 A1 * | 11/2022 | Godbole | G16H 50/20 |
| 2022/0365834 A1 * | 11/2022 | Chen | G06F 11/0793 |
| 2022/0413956 A1 * | 12/2022 | Mathew | H04L 43/16 |
| 2023/0007023 A1 * | 1/2023 | Andrabi | H04L 63/1425 |

(Continued)

FOREIGN PATENT DOCUMENTS

GB 2615295 A * 8/2023 ............ G05B 13/048

*Primary Examiner* — Hasanul Mobin
(74) *Attorney, Agent, or Firm* — Thomas Horstemeyer, LLP (57) ABSTRACT

Disclosed are various embodiments for data anomaly detection. A variable profile is generated for each variable in source data. Then, the variable profiles are provided to each of a plurality of machine learning models. Next, it is determined, with each of the plurality of machine learning models, whether each variable profile is anomalous. The determination, from each of the plurality of machine learning models, whether each variable profile is anomalous is provided to an ensemble model. The ensemble model then generates a final determination whether each variable profile is anomalous. The final determination is then reported to an analysis service.

20 Claims, 4 Drawing Sheets

(56) References Cited

U.S. PATENT DOCUMENTS

| | | | | |
|---|---|---|---|---|
| 2023/0267368 A1* | 8/2023 | Paulitsch | ............ | G05B 23/0254 |
| | | | | 706/12 |
| 2023/0376026 A1* | 11/2023 | Zhang | ................. | G06N 3/0455 |
| 2024/0104083 A1* | 3/2024 | Dhingra | .............. | G06F 16/2365 |

* cited by examiner

DATA ANOMALY DETECTION

BACKGROUND

High quality data or data sets is important for machine learning and data analysis. Data with anomalous values (e.g., inconsistent, erroneous, or missing values) can lead to erroneous or biased machine learning models, or lead to incorrect conclusions from an analysis of the data. Anomalous values can be introduced into a data set in a variety of ways, such as inaccurate or imprecise data collection or pre-processing.

Generally, data anomalies can be detected by determining whether individual values for individual variables are outside an expected range or distribution of values. However, given the nearly infinite variety of data sources and data sets, identifying anomalies in a data set is usually a manual process. For example, data analysts often spend as much as 40% of their time vetting and validating data before it can be used for model building or strategic decision-making. As another example, data scientists can spend as much as 50% to 80% of their time in collecting and preparing data before it can be explored for useful insights.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches that use machine learning to identify anomalies in large data sets. These approaches automatically identify the variables in a data set and generate profiles for the values of each variable. To determine whether a data set is anomalous (e.g., if it contains one or more variables with values outside of an expected or normal range of values), various machine learning techniques can then compare each value for each profile with previously generated profiles for previous versions of the data set to classify the data set as a whole or individual variables of the data set as being anomalous. For example, various implementations could profile a column in a table to determine the mean, median, mode, minimum, and maximum values in the column. In some instances, an expected distribution of values for the column could then be determined. Multiple machine learning models could then be used in concert to determine whether the values in the column of the table contain an expected set or range of values or if they contain anomalous values (e.g., the values are higher than expected, lower than expected, the average value is unexpected, etc.). As a result, various embodiments of the present disclosure are able to automatically identify anomalous data values in a data set (e.g., a table), regardless of the source of the data or the format of the data.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
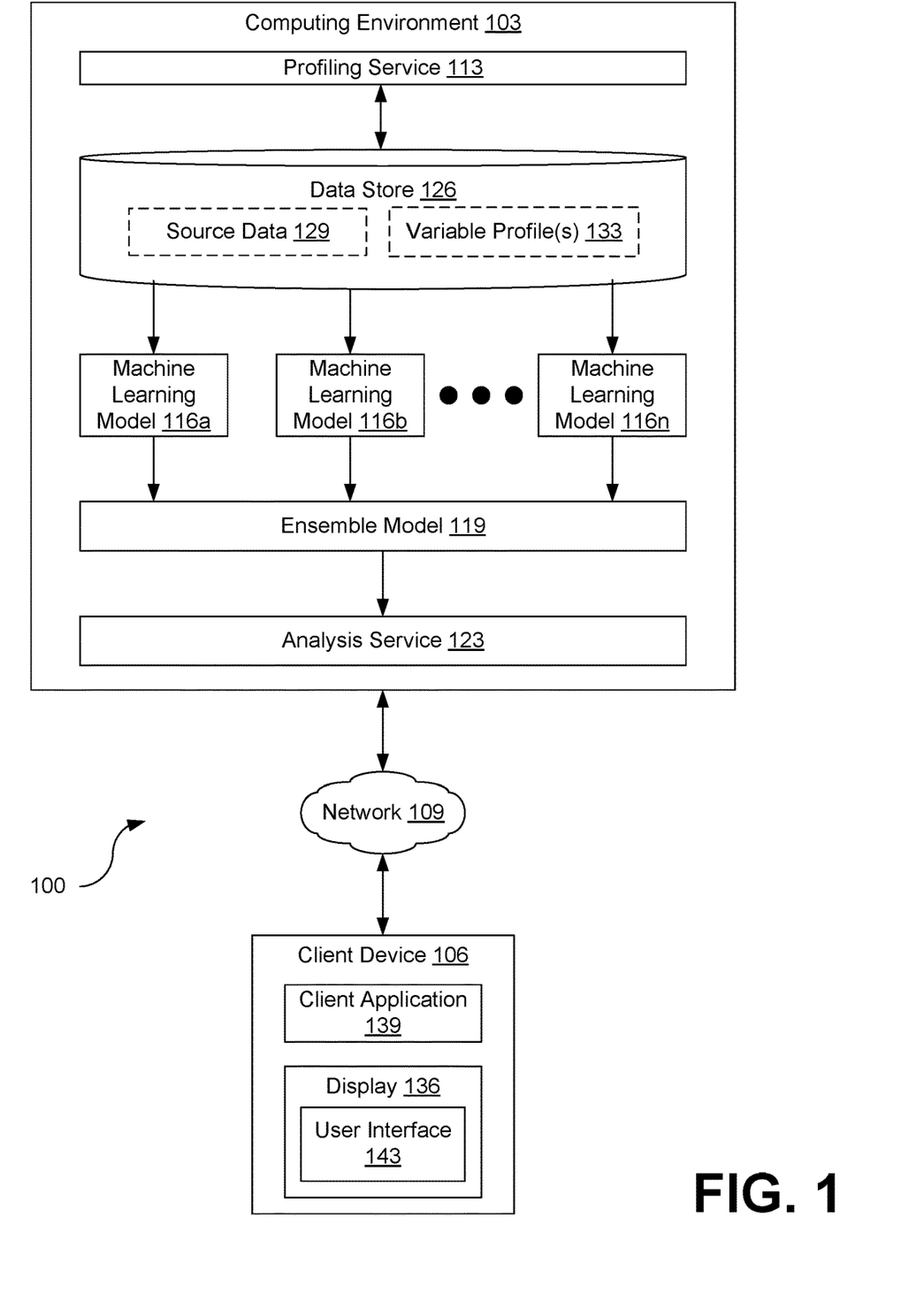
FIG. 1 is a drawing of a network environment according to various embodiments of the present disclosure.

With reference to FIG. 1, shown is a network environment 100 according to various embodiments. The network environment 100 can include a computing environment 103, and a client device 106, which can be in data communication with each other via a network 109.

The network 109 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103. The components executed on the computing environment 103 include a profiling service 113, one or more machine learning models 116 (e.g., machine learning models 116*a*-*n*), an ensemble model 119, and an analysis service 123 and other applications, services, processes, systems, engines, or functionality not discussed in detail herein.

Also, various data is stored in a data store 126 that is accessible to the computing environment 103. The data store 126 can be representative of a plurality of data stores 126, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 126 is associated with the operation of the various applications or functional entities described below. This data can include source data 129, variable profile(s) 133, and potentially other data.

The source data 129 can represent any data that will be evaluated for anomalous values. For example, the source data 129 could include one or more tables containing one or more columns and one or more rows. Each column could represent a variable and each row could represent a set of related values for a set of variables.

Each variable profile 133 can represent a profile of an individual variable (e.g., a column) in the source data 129. A variable profile 133 can include independent information about a variable, such as the mean, median, mode, minimum, and maximum values. A variable profile 133 can also include information such as the number of instances in which a value for the variable is missing (e.g., the number of rows in a table with missing data for the column). Variable profiles 133 can also include dependent information about a variable, such as the strength of correlations between values for different variables.

The profiling service 113 can be executed to generate variable profiles 133 for source data 129. For example, each time a table is saved to a data store 126, the profiling service 113 could be executed to generate variable profiles 133 for each column in the table.

The machine learning models 116 can be executed to analyze individual variable profiles 133 of individual variables in the source data 129 as an outlier or erroneous value (e.g., an anomaly). Examples of machine learning models 116 that could be used in the various embodiments of the present disclosure include isolation forest models, exponentially weighted moving average models, recurrent or convolutional neural networks, decision trees, etc. Multiple machine learning models 116 can be used to improve the accuracy of the classification. In implementations where multiple machine learning models 116 are utilized, the results from the individual machine learning models 116 can be provided to an ensemble model 119 for a final determination.

The ensemble model 119 can be executed to resolve inconsistencies between the outputs or classifications of different machine learning models 116. For example, if a first machine learning model 116a were to classify a value for a variable in the source data 129 as an expected value while a second machine learning model 116b were to classify the same value for the variable in the source data 129 as an unexpected, outlier, inconsistent, or otherwise anomalous value, the ensemble model 119 could make the final determination. Various ensemble models 119 could be used in various implementations, such as voting ensemble methods, stacking ensemble methods, bootstrap+aggregating ("Bagging") methods, boosting methods (e.g., using gradient boosting or XGboosting), etc. The final determination made by the ensemble model 119 can then be provided to the analysis service 123.

The analysis service 123 can be executed to facilitate the review of the results of the ensemble model 119 by users. If a value for a variable is flagged as an outlier or erroneous value (e.g., an anomaly), the analysis service 123 can send a notification to a client device 106 to alert a user. The user could then interact with the analysis service 123 to review the flagged value for further investigation. The analysis service 123 can also be used to further train the machine learning models 116 and/or the ensemble model 119 based at least in part on user inputs or feedback, which could be provided on an ongoing basis or as part of a periodic (e.g., monthly, quarterly, annually, etc.) calibration process. For example, the analysis service 123 could allow a user to confirm that the value for the variable was correctly classified as an outlier or erroneous value (e.g., an anomaly) or to indicate that the value for the variable was incorrectly classified as an outlier or erroneous value (e.g., an anomaly). The user feedback could then be provided by the analysis service 123 to the machine learning models 116 or the ensemble model 119 to further train the machine learning models 116 and the ensemble model 119.

The client device 106 is representative of a plurality of client devices that can be coupled to the network 109. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays 136, such as liquid crystal displays (LCDs), gas plasma-based flat panel displays, organic light emitting diode (OLED) displays, electrophoretic ink ("E-ink") displays, projectors, or other types of display devices. In some instances, the display 136 can be a component of the client device 106 or can be connected to the client device 106 through a wired or wireless connection.

The client device 106 can be configured to execute various applications such as a client application 139 or other applications. The client application 139 can be executed by the client device 106 to allow a user of the client device 106 to interact with the analysis service 123. To this end, the client application 139 can include a browser, a dedicated application, or other executable, and the user interface 143 can include a network or web page, an application screen, or other user mechanism for obtaining user input. The client device 106 can be configured to execute applications beyond the client application 139 such as email applications, social networking applications, word processors, spreadsheets, or other applications.

Next, a general description of the operation of the various components of the network environment 100 is provided. Although the following description provides merely an illustration of the interactions between the various components of the network environment 100, other interactions between the various components of the network environment 100 are also possible.

To begin, source data 129 can be received and stored in the data store 126. For example, source data 129 could be received on a periodic basis (e.g., daily, hourly, etc.). In some implementations, the source data 129 could be segregated and/or stored separately based on the interval of time that the source data 129 is received. For example, if a table of data is received daily, each table could be separately stored in the data store 126.

The profiling service 113 can then generate one or more variable profiles 133 for the source data 129. This could include calculating the mean, median, mode, minimum, and maximum values for each variable, as well as counting the number of instances in which a value for the variable is missing or the number of instances in which a value for the variable is equal to zero (sometimes referred to as the "zero-percent"). In some implementations, the profiling service 113 could also identify correlations between values for different variables and calculate or otherwise determine the strength of the correlations between the values for the different variables. In these implementations, the correlations could be identified at the time the variable profiles 133 are generated or as part of a post-processing step or phase. For example, in a large table, the profiling service 113 could calculate the mean, median, mode, minimum, and maximum values for each column based at least in part on the values in the individual rows of the table, as well as count the number of rows that are missing a value for the column. The profiling service 113 could also identify correlations between values in different columns (e.g., for a given value in a first column of a row, how likely is a second value for a second column to appear in the same row). Where there are multiple instances of source data 129, such as multiple tables stored in the data store 126, the profiling service 113 could create a separate set of variable profiles 133 for each instance of source data 129.

The profiling data 133 can then be processed using machine learning to identify anomalous or outlier values. Accordingly, the respective set of variable profiles 133 for the source data 129 can be provided to each of one or more machine learning models 116. Each machine learning model 116 can then determine, based at least in part on the variable profiles 133, whether any individual variable in the source data 129 is anomalous (e.g., whether a variable contains one or more values that are outliers or otherwise anomalous). For example, if the mean value for a variable deviated from the range of mean values of previous variable profiles 133, this could indicate the presence of one or more anomalous values in the variable. As another example, if the maximum value for the variable were outside the range of maximum values of previous variable profiles 133, this could indicate the presence of one or more anomalous values in the variable. Similarly, if the minimum value for the variable were outside the range of minimum values of previous variable profiles 133, this could indicate the presence of one or more anomalous values in the variable. Similar comparisons for other metrics stored in a variable profile 133 could similarly be used to indicate or identify potential anomalies.

The results of the machine learning models 116 are then provided to the ensemble model 119, which makes a final classification for individual values based at least in part on the results of the individual machine learning models 116 and resolving any inconsistent or opposing classifications provided by the individual machine learning models 116. The final classification for each value is then provided by the ensemble model 119 to the analysis service 123.

The analysis service 123 can then alert a user that one or more anomalous values in the source data 129 have been identified. The user can then use a client application 139 to interact with the analysis service 123 to view the individual values for the individual variables that have been classified by the ensemble model 119 as being anomalous. The user can also use the client application 139 to provide feedback to the analysis service 123 regarding the classifications. For example, the user could confirm that a classification of a value for a variable by the ensemble model 119 is correct or the user could indicate that the value for the variable was incorrectly classified as anomalous. This feedback could then be provided by the analysis service 123 to the ensemble model 119 and the machine learning models 116 to train them in order to improve their accuracy for processing future sets of source data 129. This training could be performed iteratively or continuously (e.g., in response to a data analyst reviewing identified potential anomalies) or on a periodic basis (e.g., as part of a weekly, monthly, quarterly, annually, etc. calibration or training process).

Figure 2:
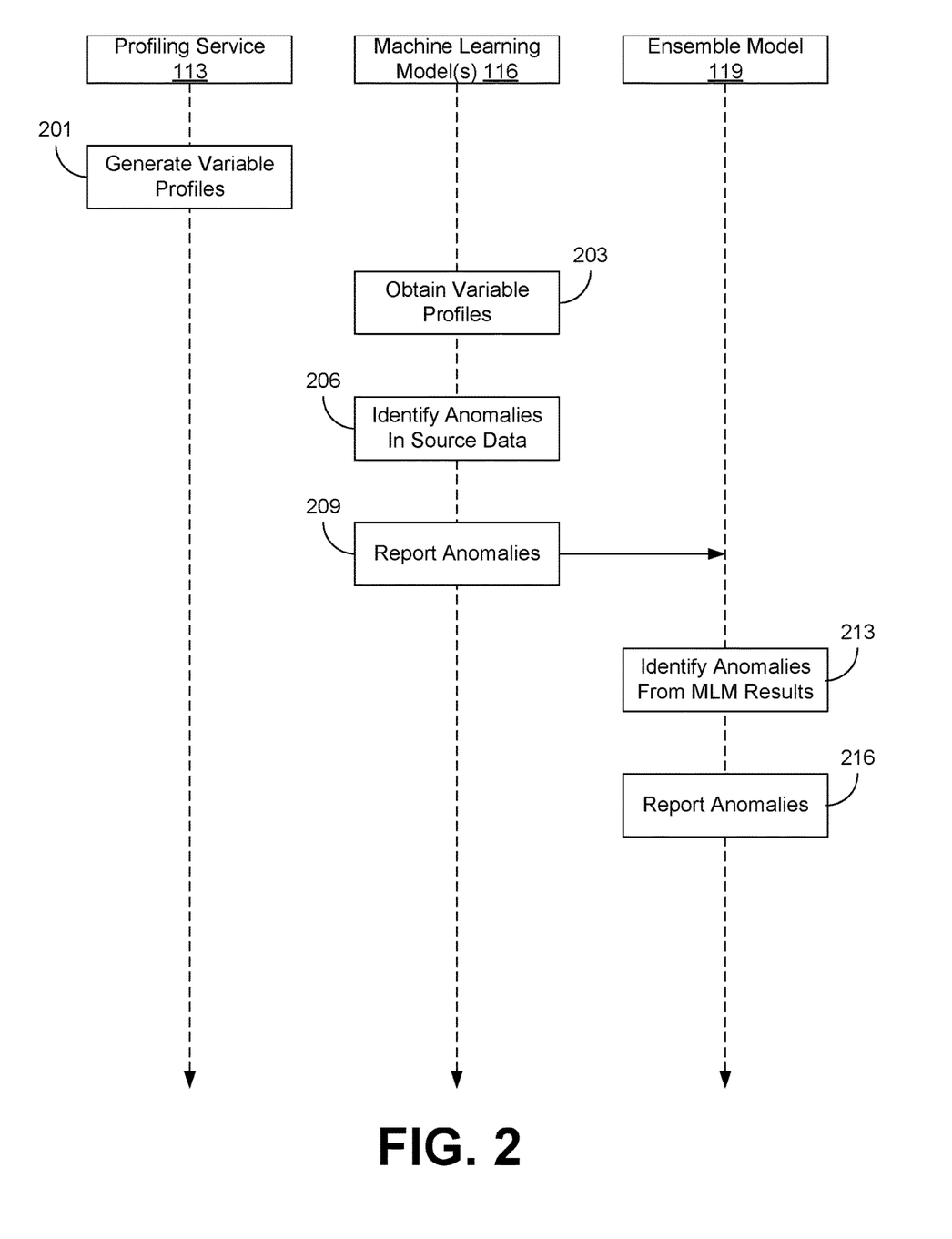
FIG. 2 is a flowchart illustrating one example of functionality implemented as portions of an application executed in a computing environment in the network environment of FIG. 1 according to various embodiments of the present disclosure.

Referring next to FIG. 2, shown is a sequence diagram that provides one example of the interactions between the profiling service 113, one or more machine learning models 116, and the ensemble model 119. The sequence diagram of FIG. 2 provides merely an example of the different types of interactions between the components of the network environment 100. As an alternative, the sequence diagram of FIG. 2 can be viewed as depicting an example of elements of a method implemented within the network environment 100.

Beginning with block 201, the profiling service 113 can generate one or more variable profiles 133 for each variable in the source data. This could include calculating the mean, median, mode, minimum, and maximum values for each variable, as well as counting the number of instances in which a value for the variable is missing. In some implementations, the profiling service 113 could also identify correlations between values for different variables and calculate or otherwise determine the strength of the correlations between the values for the different variables. However, in other implementations, these correlations could be identified in a separate step, such as a post-processing step or process. For example, in a large table, the profiling service 113 could calculate the mean, median, mode, minimum, and maximum values for each column based at least in part on the values in the individual rows of the table, as well as count the number of rows that are missing a value for the column. The profiling service 113 could also identify correlations between values in different columns (e.g., for a given value in a first column of a row, how likely is a second value for a second column to appear in the same row).

Once the variable profiles 133 are generated, they can be stored by the profiling service 113 in the data store 126 for future use. In some implementations, however, the profiling service 113 could provide the variable profiles 133 directly to the machine learning models 116. This could occur, for example, if the machine learning models 116 requested the variable profiles 133 from the profiling service 113 in response to receiving or otherwise obtaining the source data 129 to be processed.

Moving to box 203, one or more machine learning models 116 can each obtain the variable profiles 133 for the source data 129 to be analyzed for anomalies. For example, each machine learning model 116 could periodically check for the presence of a new set of source data 129 and new variable profile(s) 133. Each machine learning model 116 could then retrieve the variable profile(s) 133 from the data store 126 associated with the new set of source data 129. As another example, each machine learning model 116 could be provided with the variable profile(s) 133 for the respective source data 129, for example as arguments when the machine learning models 116 are being invoked or called to execute by another application.

Then, at box 206 each machine learning model 116 can analyze the source data 129 to identify values for variables that are potential anomalies based at least in part on the variable profile 133 of the variable. For example, a machine learning model 116 could be trained to determine that a value for a variable that is greater than a learned number of standard deviations from the mean, median, or mode value is an anomaly. A machine learning model 116 could therefore classify individual values for a variable in the source data 129 as being anomalous if they are greater than the learned number of standard deviations from the mean, median, or mode values for the variable. As another example, a machine learning model 116 could be trained to determine that value for a variable that is within a learned distance of a minimum or maximum value for the variable should be classified as an anomaly. Accordingly, the machine learning model 116 could classify individual values that are within the learned distance of the minimum or maximum value as anomalies. In an additional example, a machine learning model 116 could be trained to determine that a value of a first variable that is inconsistent with an identified correlation with a value for a second variable should be classified as an anomaly. Therefore, the machine learning model 116 could classify an uncorrelated value of the second variable as an anomaly based at least in part on the value of the first variable.

Moreover, the machine learning models 116 could identify anomalies and mark or flag them in a variety of manners. For example, a machine learning model 116 could use a binary approach for identifying individual values (e.g., the value for each cell in a column could be classified as "anomalous" or "not anomalous"). However, a machine learning model 116 could also use a graduated approach for identifying individual anomalies, such as assigning probabilities to individual cells that represent how likely the value in the cell is to be an anomaly. Low probabilities could represent strong indications that the value is not an anomaly, while high probabilities could represent strong indications that the value is an anomaly.

Next, at box 209, the machine learning models 116 can report to the ensemble model 119 each variable that has been flagged as an anomaly. For example, each machine learning model 116 could report the resulting classification for each variable (e.g., each column) identified in the source data 129 (e.g., a table).

Proceeding to box 213, the ensemble model 119 can analyze the resulting classifications received from the machine learning models 116 to determine whether each variable in the source data 129 is an anomaly or not. For example, if all of the machine learning models 116 classified a particular value as being an anomaly, the ensemble model 119 could classify the value as being an anomaly. Similarly, if all of the machine learning models 116 classified a particular value as not being an anomaly, the ensemble model 119 could classify the value as not being an anomaly. However, if different machine learning models 116 provided different classifications for a value for a variable (e.g., machine learning model 116a classified the value as being anomalous while machine learning model 116b classified the value as not being anomalous), the ensemble model 119 could make a final determination as to whether the value for the variable should be classified as an anomaly using various ensemble machine learning techniques, such as voting ensemble methods, stacking ensemble methods, bootstrap+ aggregating ("Bagging") methods, boosting methods (e.g., using gradient boosting or XGboosting), etc.

Referring next to box 216, the ensemble model 119 can then report the final determinations and results to the analysis service 123. For example, the ensemble model 119 could report to the analysis service the identities of the variables in the source data (e.g., the identities of columns in a table) that were classified by the ensemble model 119 as being anomalies. The analysis service 123 can then use these classifications to notify a user of the anomalous values for further investigation.

Figure 3:
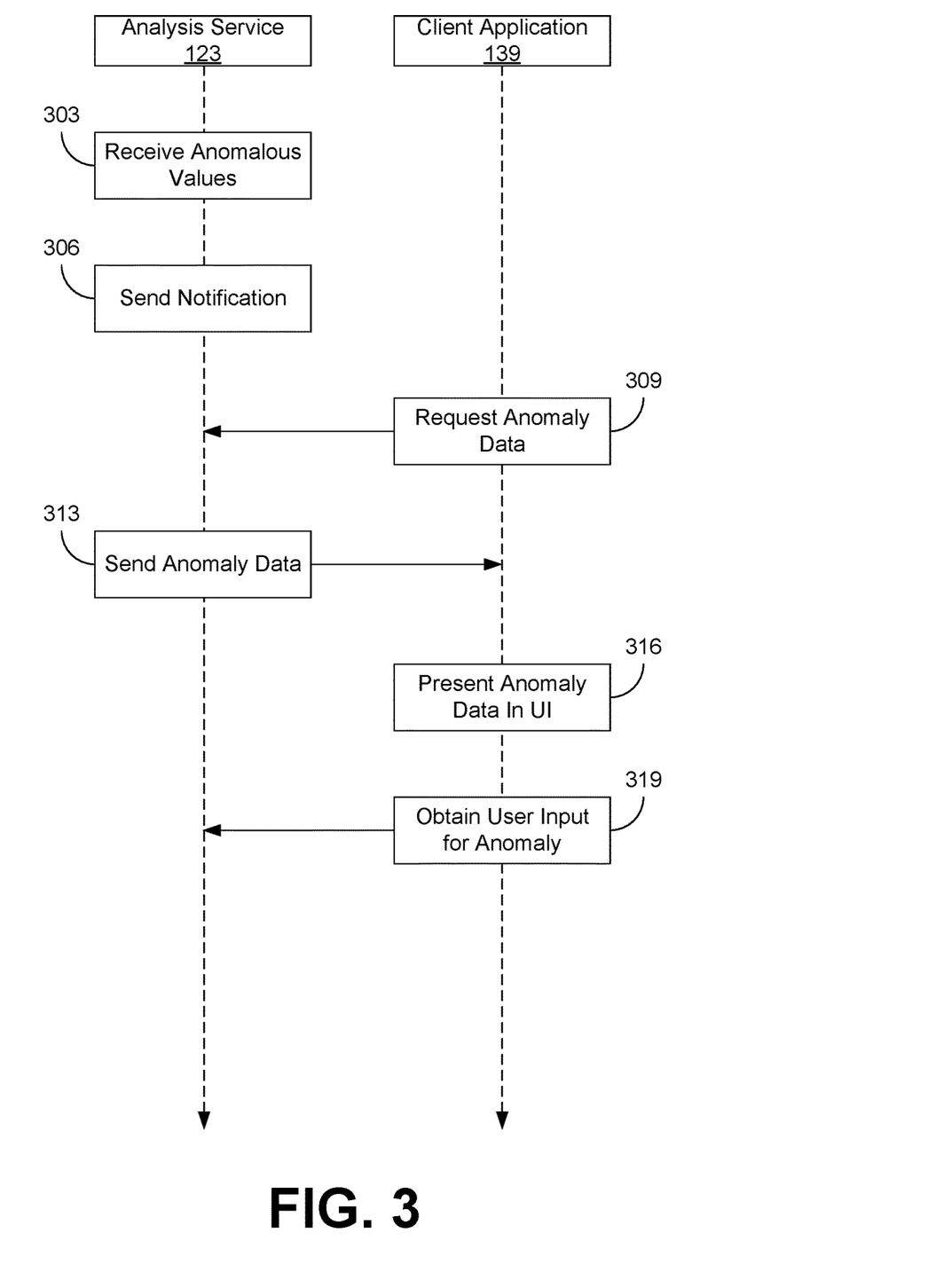
FIG. 3 is a flowchart illustrating one example of functionality implemented as portions of an application executed in a computing environment in the network environment of FIG. 1 according to various embodiments of the present disclosure.

Referring next to FIG. 3, shown is a sequence diagram that provides one example of the interactions between the analysis service 123 and the client application 139. The sequence diagram of FIG. 3 provides merely an example of the different types of interactions between the components of the network environment 100. As an alternative, the sequence diagram of FIG. 3 can be viewed as depicting an example of elements of a method implemented within the network environment 100.

Beginning with block 303, the analysis service 123 can receive the identity of individual variables that had been classified by the ensemble model 119 as being anomalies in the source data 129. For example, the analysis service 123 could receive the list of columns in a table that were classified as containing anomalous values, such as a list of the names or numbers of the columns. How these values are identified and provided to the analysis service 123 has been previously described and illustrated in FIG. 2.

Moving on to block 306, the analysis service 123 can send a notification to the user of the client device 106. For example, the analysis service 123 could send an email notification to a predefined email address for the user. As another example, the analysis service 123 could send an in-application push notification to the client application 139 executing on the client device 106.

Later, at block 309, the client application 139 can send a request to the analysis service 123 for anomaly data related to one or more variables that had been identified by the ensemble model 119 as anomalous. For example, a user could use a web browser to submit query or follow a hyperlink to retrieve information about one or more values that were identified or classified by the ensemble model 119 as anomalies. The user could similarly use a dedicated application to query or retrieve the information about one or more values that were identified or classified by the ensemble model 119 as anomalies.

Next, at block 313, the analysis service 123 can send the anomaly data to the client application 139 in response to the request received at block 309. This could include information such as the identity of the variable (e.g., the column in a table). This information can allow a user to review the value for the variable and determine whether it is in fact an anomaly.

Proceeding to block 316, the client application 139 can present the anomaly data sent at block 313 in a user interface 143 presented on display 136 of the client device 106. The user interface 143 can allow the user to review the data and provide input confirming or correcting the classification of the value as an anomaly.

Subsequently, at block 319, the client application 139 can obtain user input for the anomaly. For example, the client application 139 could obtain user input confirming that the value is anomaly (e.g., in response to further investigation by the user) or correcting the classification (e.g., by reporting that the value is not, in fact, an anomaly). The user input related to specific values can then be reported back to the analysis service 123 by the client application 139.

Figure 4:
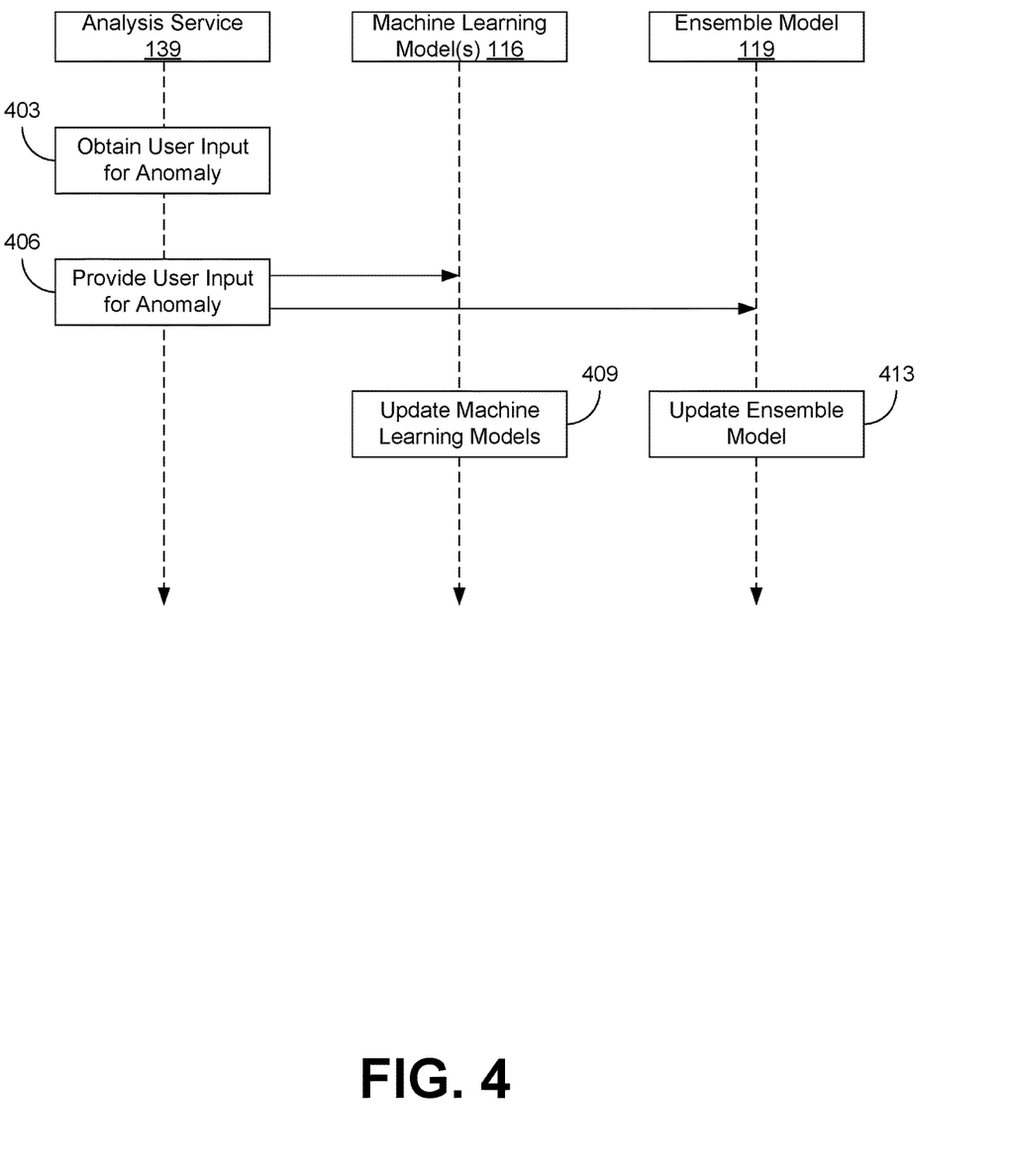
FIG. 4 is a flowchart illustrating one example of functionality implemented as portions of an application executed in a computing environment in the network environment of FIG. 1 according to various embodiments of the present disclosure.

Referring next to FIG. 4, shown is a sequence diagram that provides one example of the interactions between the analysis service 123, the machine learning models 116, and the ensemble model 119. The sequence diagram of FIG. 4 provides merely an example of the different types of interactions between the components of the network environment 100. As an alternative, the sequence diagram of FIG. 4 can be viewed as depicting an example of elements of a method implemented within the network environment 100.

Beginning with block 403, the analysis service 123 can obtain user inputs (e.g., confirmations or corrections) related to individual variables classified by the ensemble model 119 as being anomalous. The manner in which the confirmations or corrections are obtained have been previously described and illustrated in FIG. 3.

Then, at block 406, the user input (e.g., a confirmation or correction) for each variable that has been classified as an anomaly is provided by the analysis service 123 to both the ensemble model 119 and the machine learning models 116 underlying the ensemble model 119. These results can be provided by the analysis service 123 to provide feedback to the models in order to update them and improve their classification accuracy. The results can be provided to the machine learning models 116, for example, in order to train each machine learning model 116 to make a more accurate classification. Similarly, the results can be provided to the ensemble model 119 in order to train the ensemble model 119 to make a better classification based on the outputs of the machine learning models 116.

Subsequently, at block 409, each machine learning model 116 can update itself based at least in part on the feedback provided at block 406. Similarly, at block 413, the ensemble model 119 can update itself based at least in part on the feedback provided at block 406.

Applicant notes that the operations depicted in the sequence diagram of FIG. 4 could occur at various points in time. For example, these operations could be performed by a data analyst while he or she is analyzing anomalous data. This could allow for continuous improvement of the machine learning models 116 and/or the ensemble model 119. However, one or more of these operations could also be performed periodically (e.g., weekly, quarterly, yearly, etc.) as part of a calibration or training process for the machine learning models 116 and/or the ensemble model 119.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   a computing device comprising a processor and a memory;
   a profiling service stored in the memory that, when executed by the processor, causes the computing device to at least:
   generate a variable profile for each variable in source data, each variable representing a column in the source data and the variable profile comprising one or more of a mean, median, mode, minimum, or maximum value for the column in the source data; and
   provide the variable profile for each variable to each of a plurality of machine learning models;
   wherein the plurality of machine learning models are stored in the memory and each of the plurality of machine learning models, when executed by the processor, causes the computing device to at least:
   determine whether each variable profile is anomalous; and
   provide a determination whether each variable profile is anomalous to an ensemble model; and
   wherein the ensemble model is stored in the memory and, when executed by the processor, causes the computing device to at least:
   analyze each variable profile using one or more ensemble machine-learning techniques; and
   generate a final determination whether each variable profile is anomalous based at least in part on the determination received from each of the plurality of machine learning models; and
   report the final determination for each variable profile to an analysis service, wherein the analysis service is further stored in the memory of the computing device and, when executed by the processor, further causes the computing device to at least:
   receive, from a client device, an indication of the accuracy of the final determination; and
   update the ensemble model based at least in part on the indication of the accuracy of the final determination.

2. The system of claim 1, wherein the analysis service, when executed by the processor, further causes the computing device to at least:
   update each of the plurality of machine learning models based at least in part on the indication of the accuracy of the final determination.

3. The system of claim 1, wherein the ensemble model is further configured to compute a severity score for each anomalous value, wherein the final determination further comprises the severity score.

4. The system of claim 1, wherein the source data is formatted as a table, with each variable being represented by a column in the table.

5. The system of claim 1, wherein at least one of the plurality of machine learning models is an exponentially weighted moving average model.

6. The system of claim 1, wherein at least one of the plurality of machine learning models is an isolation forest model.

7. A method, comprising:
   generating a variable profile for each variable in source data, each variable representing a column in the source data and the variable profile comprising one or more of a mean, median, mode, minimum, or maximum value for the column in the source data;

providing the variable profile to each of a plurality of machine learning models;

determining, with each of the plurality of machine learning models, whether each variable profile is anomalous;

providing a determination, from each of the plurality of machine learning models, whether each variable profile is anomalous to an ensemble model;

analyzing, each variable profile with the ensemble model, the determination from each of the plurality of machine learning model using one or more ensemble machine learning techniques;

generating, with the ensemble model, a final determination whether each variable profile is anomalous; and reporting the final determination for each variable profile to an analysis service, wherein the analysis service is configured to:

receive, from a client application, an indication of the accuracy of the final determination; and update the ensemble model based at least in part on the indication of the accuracy of the final determination.

8. The method of claim 7, wherein the analysis service is further configured to at least:

update each of the plurality of machine learning models based at least in part on the indication of the accuracy of the final determination.

9. The method of claim 7, wherein generating the final determination whether each variable profile is anomalous further comprises computing a severity score for each anomalous value, wherein the final determination further comprises the severity score.

10. The method of claim 7, wherein the source data is formatted as a table, with each variable being represented by a column in the table.

11. The method of claim 7, wherein at least one of the plurality of machine learning models is an exponentially weighted moving average model.

12. The method of claim 7, wherein at least one of the plurality of machine learning models is an isolation forest model.

13. A non-transitory, computer-readable medium, comprising machine-readable instructions that, when executed by a processor of a computing device, cause the computing device to at least:

generate a variable profile for each variable in source data, each variable representing a column in the source data and the variable profile comprising one or more of a mean, median, mode, minimum, or maximum value for the column in the source data;

provide the variable profile to each of a plurality of machine learning models;

determine, with each of the plurality of machine learning models, whether each variable profile is anomalous;

provide a determination, from each of the plurality of machine learning models, whether each variable profile is anomalous to an ensemble model;

analyze, each variable profile with the ensemble model, the determination from each of the plurality of machine learning model using one or more ensemble machine learning techniques;

generate, with the ensemble model, a final determination whether each variable profile is anomalous; and report the final determination for each variable profile to an analysis service, wherein the analysis service is configured to at least:

receive, from a client application, an indication of the accuracy of the final determination; and update the ensemble model based at least in part on the indication of the accuracy of the final determination.

14. The non-transitory, computer-readable medium of claim 13, wherein the analysis service is further configured to at least:

update each of the plurality of machine learning models based at least in part on the indication of the accuracy of the final determination.

15. The non-transitory, computer-readable medium of claim 13, wherein the machine-readable instructions, when executed by the processor, further cause the computing device to at least compute a severity score for each anomalous value, wherein the final determination further comprises the severity score.

16. The non-transitory, computer-readable medium of claim 13, wherein at least one of the plurality of machine learning models is an exponentially weighted moving average model.

17. The non-transitory, computer-readable medium of claim 13, wherein at least one of the plurality of machine learning models is an isolation forest model.

18. The system of claim 1, wherein the analysis service is further configured to at least send an alert to the client application that a respective variable for a respective variable profile is anomalous.

19. The method of claim 7, wherein the analysis service is further configured to at least send an alert to the client application that a respective variable for a respective variable profile is anomalous.

20. The non-transitory, computer-readable medium of claim 13, wherein the analysis service is further configured to at least send an alert to the client application that a respective variable for a respective variable profile is anomalous.

* * * * *